(12) United States Patent
Iwayama

(10) Patent No.: US 8,879,853 B2
(45) Date of Patent: Nov. 4, 2014

(54) SYSTEM, METHOD AND PROGRAM FOR ENUMERATING LOCAL ALIGNMENTS FROM PAIR OF DOCUMENTS

(75) Inventor: Makoto Iwayama, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 460 days.

(21) Appl. No.: 13/221,939

(22) Filed: Aug. 31, 2011

(65) Prior Publication Data

US 2012/0062589 A1 Mar. 15, 2012

(30) Foreign Application Priority Data

Sep. 10, 2010 (JP) ................................. 2010-202745

(51) Int. Cl.
*G06K 9/68* (2006.01)
*G06K 9/72* (2006.01)
*G06F 17/30* (2006.01)

(52) U.S. Cl.
CPC ................................. *G06F 17/30696* (2013.01)
USPC .............................. 382/218; 382/219; 382/229

(58) Field of Classification Search
CPC ................................. G06F 17/30634–17/30696
USPC .......... 382/175, 176, 184, 193, 194, 203, 204, 382/205, 287, 290, 294, 295
See application file for complete search history.

(56) References Cited

U.S. PATENT DOCUMENTS

| 2002/0021838 A1* | 2/2002 | Richardson et al. | 382/181 |
| 2007/0076938 A1* | 4/2007 | Hartman et al. | 382/132 |
| 2011/0243477 A1* | 10/2011 | Minerich | 382/294 |

FOREIGN PATENT DOCUMENTS

JP 2004-38329 2/2004

OTHER PUBLICATIONS

Dan Gusfield, Algorithms on Strings, Trees, and Sequences, Cambridge University Press, 1997, pp. 232-234.

* cited by examiner

*Primary Examiner* — Brian Le
(74) *Attorney, Agent, or Firm* — Antonelli, Terry, Stout & Kraus, LLP.

(57) ABSTRACT

Provided is a system for enumerating local alignments, comprising a local alignment enumeration module for enumerating local alignments, in a case where the cell of a second matrix corresponding to a cell at a transition source indicates that the cell belongs to a local alignment, and in a case where the maximum score calculated is larger than the predetermined value, registers, in the cell of the second matrix corresponding to the cell to be calculated, an identifier of a local alignment registered in the cell of the second matrix corresponding to the cell at the transition source, and further, in a case where the maximum score calculated is larger than a maximum score of the cells belonging to the same local alignment, stores the cell to be calculated as an end point of the local alignment.

14 Claims, 12 Drawing Sheets

|   |   | 精 | 度 | 向 | 上 | の | 特 | 許 | を | 検 | 索 |
|---|---|---|---|---|---|---|---|---|---|---|---|
|   | 0 | 0 | 0 | 0 | 0 | 0 | 0 | 0 | 0 | 0 | 0 |
| 特 | 0 | 0 | 0 | 0 | 0 | 0 | 2 | 1 | 0 | 0 | 0 |
| 許 | 0 | 0 | 0 | 0 | 0 | 0 | 1 | 4 | 3 | 2 | 1 |
| 検 | 0 | 0 | 0 | 0 | 0 | 0 | 0 | 3 | 2 | 5 | 4 |
| 索 | 0 | 0 | 0 | 0 | 0 | 0 | 0 | 2 | 1 | 4 | 7 |
| の | 0 | 0 | 0 | 0 | 0 | 2 | 1 | 1 | 0 | 3 | 6 |
| 精 | 0 | 2 | 1 | 0 | 0 | 1 | 0 | 0 | 0 | 2 | 5 |
| 度 | 0 | 1 | 4 | 3 | 2 | 1 | 0 | 0 | 0 | 1 | 4 |
| の | 0 | 0 | 3 | 2 | 1 | 4 | 3 | 2 | 1 | 0 | 3 |
| 向 | 0 | 0 | 2 | 5 | 4 | 3 | 2 | 1 | 0 | 0 | 2 |
| 上 | 0 | 0 | 1 | 4 | 7 | 6 | 5 | 4 | 3 | 2 | 1 |

INITIALIZATION PROCESSING

S801
INPUT
CHARACTER STRINGS ARE EXPRESSED IN ARRAYS. FOLLOWING TWO ARRAYS ARE GIVEN AS INPUTS.
CHARACTER STRING 1: X[1..lx]
CHARACTER STRING 2: Y[1..ly]
  IT SHOULD BE NOTED THAT FIRST CHARACTER CORRESPONDS TO INDEX 1, AND X[0] AND Y[0] ARE INDETERMINATE VALUES. FURTHER, FOLLOWING PARAMETERS ARE ALSO INPUT.
    MATCH SCORE: Match
    UNMATCH SCORE: Unmatch
    SKIP SCORE: Skip S802
INITIALIZE SCORE MATRIX
  SCORE MATRIX IS EXPRESSED AS TWO-DIMENSIONAL ARRAY.
    SCORE MATRIX: M[0..lx][0..ly]
  VALUES IN 0TH ROW AND 0TH COLUMN ARE INITIALIZED TO 0.

S803
INITIALIZE LOCAL ALIGNMENT
LOCAL ALIGNMENT IS EXPRESSED BY FOLLOWING THREE ARRAYS.
  INDEX SERVES AS LOCAL ALIGNMENT ID.
    START POINT ARRAY: B
    END POINT ARRAY: E
    SCORE ARRAY: S
  VALUE OF ARRAY IS COORDINATE VALUE $(r, c)$, WHERE $r$ CORRESPONDS TO ROW OF SCORE MATRIX M AND $c$ CORRESPONDS TO COLUMN OF SCORE MATRIX M.
  ALL VALUES IN SCORE MATRIX ARE INITIALIZED TO 0.

*Fig. 8*

|   |   | 精 | 度 | 向 | 上 | の | 特 | 許 | を | 検 | 索 |
|---|---|---|---|---|---|---|---|---|---|---|---|
|   | -1 | -1 | -1 | -1 | -1 | -1 | -1 | -1 | -1 | -1 | -1 |
| 特 | -1 | -1 | -1 | -1 | -1 | -1 | 0 | 0 | -1 | -1 | -1 |
| 許 | -1 | -1 | -1 | -1 | -1 | -1 | 0 | 0 | 0 | 0 | 0 |
| 検 | -1 | -1 | -1 | -1 | -1 | -1 | -1 | 0 | 0 | 0 | 0 |
| 索 | -1 | -1 | -1 | -1 | -1 | -1 | -1 | 0 | 0 | 0 | 0 |
| の | -1 | -1 | -1 | -1 | -1 | -1 | -1 | 0 | -1 | 0 | 0 |
| 精 | -1 | 1 | 1 | -1 | -1 | -1 | -1 | -1 | -1 | 0 | 0 |
| 度 | -1 | 1 | 1 | 1 | 1 | -1 | -1 | -1 | -1 | 0 | 0 |
| の | -1 | -1 | 1 | 1 | 1 | 1 | 1 | 1 | 1 | -1 | 0 |
| 向 | -1 | -1 | 1 | 1 | 1 | 1 | 1 | 1 | -1 | -1 | 0 |
| 上 | -1 | -1 | 1 | 1 | 1 | 1 | 1 | 1 | 1 | 1 | 0 |

*Fig. 10*

SYSTEM, METHOD AND PROGRAM FOR ENUMERATING LOCAL ALIGNMENTS FROM PAIR OF DOCUMENTS

CLAIM OF PRIORITY

The present application claims priority from Japanese patent application JP 2010-202745 filed on Sep. 10, 2010, the content of which is hereby incorporated by reference into this application.

BACKGROUND OF THE INVENTION

This invention relates to a system for enumerating local alignments, which are pairs of character strings that are similar between two documents, and more particularly, to a system for enumerating local alignments using the Smith-Waterman method.

Long documents are rarely similar in their entirety, but have partially similar parts. Take similarity between books as an example. Books often have more than one similar part. When cases where words each consisting of several characters match between the books are also considered, the number of similar parts between the books may be very large. The similar parts between two documents (pairs of similar character strings) are called local alignments. When the local alignments can be enumerated, the grounds for the similarity between the two documents can be grasped just by reading the portions around the local alignments, as opposed to reading the two entire documents.

As an example, in the examination process in patent examination or the like, identity and similarity of contents need to be judged between the application to be examined and a patent document or a non-patent document. When local alignments between the documents to be judged can be enumerated, the identity and similarity between the target documents can be judged just by reading the portions around the local alignments, as opposed to reading the entire documents, which facilitates the examination process.

In similarity search, when a character string is input, documents similar to the input character string are ranked and presented in order of similarity. In this case, a user can examine the documents that are likely to be relevant to the input character string in turn from the above. However, it is often the case that the grounds for the ranking are hard to understand, and hence the user needs to read the presented document itself in order to judge the relevance between the input character string and the presented document. When the document is long, the time needed to read the document is also long.

On the other hand, in full text search (based on exact string match), the labor of reading the entire document is reduced by presenting the portion around the character string that matches the input character string.

Therefore, also in the similarity search, by enumerating similar parts (local alignments) between the input character string and the document relevant to the input character string and presenting the enumerated local alignments, the relevance of the document can be judged without reading the entire document.

Further, when the local alignments are enumerated between claims and the specification of the patent application, an embodiment corresponding to a claim can be found at once.

A relevant art for enumerating the local alignments is the Smith-Waterman method ("Algorithms on Strings, Trees, and Sequences" (pp. 232-234), Gusfield, D., Cambridge University Press, 1997). The Smith-Waterman method efficiently searches for the local alignment having the maximum score by dynamic programming. As used herein, the term "score" refers to the similarity between partial character strings.

By enumerating the local alignments having scores that are equal to or larger than a predetermined value from a score matrix generated in the Simith-Waterman method, more local alignments can be enumerated exhaustively. However, in this method, whether or not a portion is a local alignment is judged based solely on the score, and hence a large number of similar local alignments are enumerated around the local alignments that have already been enumerated. Therefore, it is necessary to sort out only representative ones of the local alignments. In other words, both the representativeness and the exhaustiveness need to be satisfied.

JP 2004-038329A describes the method for improving the efficiency of enumerating the local alignments while suppressing the reduction in accuracy of enumerating the local alignments in the Smith-Waterman method as much as possible. Specifically, pairs of exactly matching character strings are enumerated, and character strings within a predetermined gap in the enumerated pairs of character strings are connected.

SUMMARY OF THE INVENTION

It should be noted, however, that in order to enumerate the pairs of exactly matching character strings in the method described in JP 2004-038329A, indices such as suffix arrays must be created in advance. Further, the accuracy of enumerating the local alignments described in JP 2004-038329A is inferior to the Smith-Waterman method. Software programs used for searching gene sequences, such as BLAST and FASTA, also attain higher speed at the expense of accuracy as in the case of the method described in JP 2004-038329A, and indices must be created in advance.

Therefore, there is a problem in that it is difficult to enumerate the local alignments in the case of unindexed data.

In a case where the local alignments are to be enumerated between arbitrary long character strings that are not indexed in advance, it is difficult to enumerate representative local alignments exhaustively. Further, the representativeness is compromised when emphasis is placed on the exhaustiveness of the local alignments, and the exhaustiveness is compromised when emphasis is placed on the representativeness.

Therefore, it is an object of this invention to provide a system for enumerating representative local alignments exhaustively between arbitrary character strings that are not indexed in advance.

According to a representative embodiment of this invention, there is provided a system for enumerating local alignments, comprising a local alignment enumeration module for enumerating local alignments, which are pairs of character strings that are similar between arbitrary two documents, the local alignment enumeration module comprising: a first matrix generation module for generating a first matrix having a character string constituting one of the two documents as a row and a character string constituting another one of the two documents as a column, by registering, in a cell corresponding to a character constituting the character string in the row and a character constituting the character string in the column, a score indicating similarity at the two characters corresponding to the cell; and a second matrix generation module for generating a second matrix by registering, in a cell corresponding to the cell for which the score is calculated by the first matrix generation module, of cells of the second matrix corresponding to cells of the first matrix, an identifier of a local alignment to which the two characters corresponding to the cell belong, the score registered in the cell of the first matrix having a value that becomes larger as the similarity between the two character strings corresponding to the cell becomes higher, the first matrix generation module being configured to: calculate scores of the cell for which the score is to be calculated based on values that are preset to paths from cells for which scores are already calculated, of cells adjacent to the cell to be calculated, to the cell to be calculated; register a maximum score of the calculated scores as the score of the cell to be calculated; and store a cell which is an origin of a path via which the maximum score is calculated as a cell at a transition source, the second matrix generation module being configured to: in a case where a cell of the second matrix corresponding to the cell at the transition source indicates that the cell does not belong to any local alignment and in a case where the maximum score calculated by the first matrix generation module is a predetermined value, register an identifier of a new local alignment in the cell of the second matrix corresponding to the cell to be calculated, and store the cell to be calculated as a start point of the new local alignment; and in a case where the cell of the second matrix corresponding to the cell at the transition source indicates that the cell belongs to a local alignment, and in a case where the maximum score calculated by the first matrix generation module is larger than the predetermined value, register, in the cell of the second matrix corresponding to the cell to be calculated, an identifier of a local alignment registered in the cell of the second matrix corresponding to the cell at the transition source, and further, in a case where the maximum score calculated by the first matrix generation module is larger than the maximum score of the cells belonging to the same local alignment, store the cell to be calculated as an end point of the local alignment.

According to this invention, representative local alignments can be enumerated exhaustively between arbitrary character strings that are not indexed in advance.

BRIEF DESCRIPTION OF THE DRAWINGS

The present invention can be appreciated by the description which follows in conjunction with the following figures, wherein:

FIG. 8 is an explanatory diagram illustrating a initialization processing according to the first embodiment of this invention;

FIG. 10 is an explanatory diagram illustrating the start point matrix according to the first embodiment of this invention;

DETAILED DESCRIPTION OF THE PREFERRED EMBODIMENTS

A first embodiment of this invention is described with reference to FIGS. 1 to 11.

Figure 1:
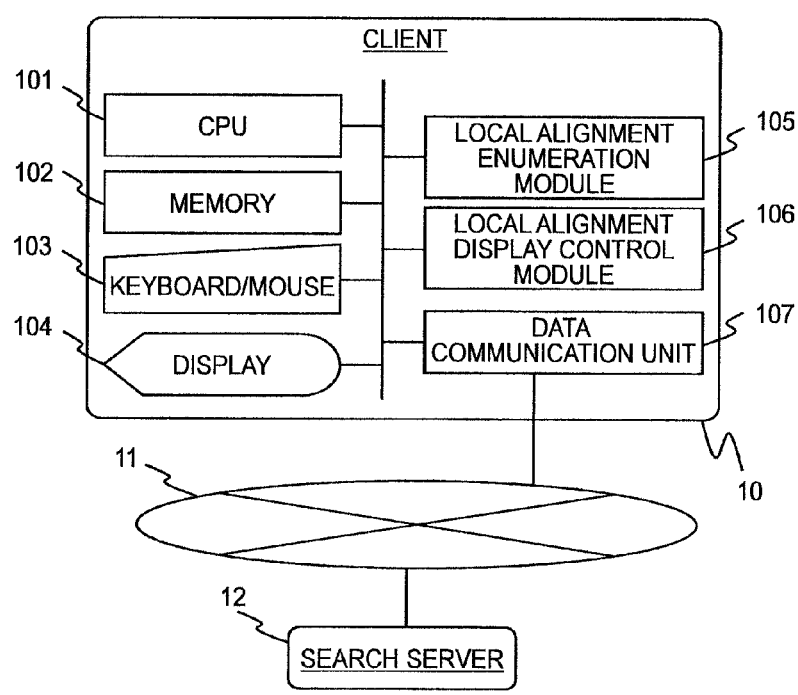
FIG. 1 is an explanatory diagram illustrating a configuration of a system for enumerating local alignments according to a first embodiment of this invention.

FIG. 1 is an explanatory diagram illustrating a configuration of a system for enumerating local alignments according to the first embodiment of this invention.

Pairs of character strings that are similar between two character strings (documents) from which enumeration is performed are called local alignments.

The system for enumerating local alignments is a system for enumerating local alignments between two character strings and displaying the enumerated local alignments. The system for enumerating local alignments includes a client 10, and a search server 12 capable of accessing the client 10 through a network 11.

The search server 12 is a computer for transmitting a target character string (target document), from which the local alignments are to be enumerated, to the client 10 through the network 11.

When the target character string is input directly to the client 10 through a keyboard/mouse 103, the system for enumerating local alignments may not include the network 11 and the search server 12.

The client 10 includes a CPU 101, a memory 102, the keyboard/mouse 103, a display 104, a local alignment enumeration module 105, a local alignment display control module 106, and a data communication unit 107.

The CPU 101 executes various programs constituting the local alignment enumeration module 105 and the local alignment display control module 106. The memory 102 temporarily stores the program executed by the CPU 101 and data required to execute the program.

The keyboard/mouse 103 is an input unit for receiving input from a user. The display 104 is a display unit for displaying the local alignments enumerated by the local alignment enumeration module 105 under the control of the local alignment display control module 106.

The local alignment enumeration module 105 enumerates the local alignments from the target character string. The local alignment display control module 106 performs control for displaying the local alignments enumerated by the local alignment enumeration module 105 on the display 104.

The data communication unit 107 is an interface for communicating data through the network 11, and is, for example, a LAN card communicable under the TCP/IP protocol.

Overall processing of the system for enumerating local alignments is outlined.

First, the client 10 acquires the pairs of the target character strings. The client 10 may use various methods to acquire the target character strings. For example, a method in which the client 10 acquires one or both of the target character strings from the search server 12, a method in which the user operates the keyboard/mouse 103 to input one or both of the target character strings to the client 10, and the like may be used.

In a case where the client 10 acquires a target character string from the search server 12, the client 10 first transmits the document number of the target character string to be acquired to the search server 12. Then, when the document number is received, the search server 12 transmits, as the target character string, a character string of a document corresponding to the received document number to the client 10.

Next, the local alignment enumeration module 105 enumerates the local alignments from the pair of the target character strings acquired. It should be noted that specific processing of enumerating the local alignments by the local alignment enumeration module 105 is described later in detail with reference to FIGS. 5 to 10.

Then, the local alignment display control module 106 displays the local alignments enumerated by the local alignment enumeration module 105 on the display 104. It should be noted that the local alignments displayed on the display 104 are described later in detail with reference to FIGS. 2 to 4.

It should be noted that, as described below in detail with reference to FIG. 6, when the local alignments are enumerated from the pair of the target character strings, the local alignment enumeration module 105 uses only character string information of the target character strings, and hence the target character strings do not need to be indexed. Therefore, the target character strings in this embodiment may be documents found in the search server 12, or may be character strings input directly by the user.

Figure 2:
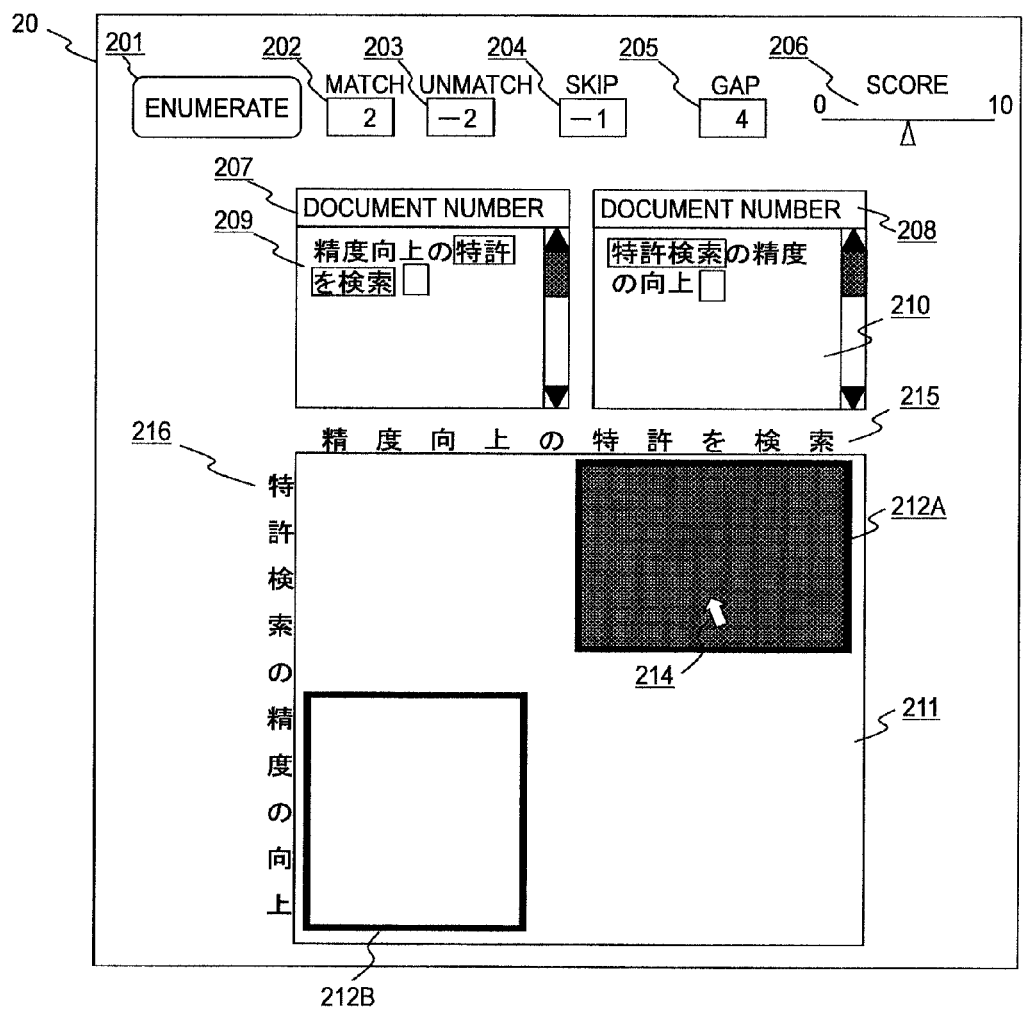
FIG. 2 is an explanatory diagram illustrating a local alignment display screen displayed on a display in the first embodiment of this invention.

FIG. 2 is an explanatory diagram illustrating a local alignment display screen 20 displayed on the display 104 in the first embodiment of this invention.

The local alignment display screen 20 is displayed on the display 104 under the control of the local alignment display control module 106.

The local alignment display screen 20 includes an "enumerate" button 201, a match score input box 202, an unmatch score input box 203, a skip score input box 204, a gap input box 205, a score threshold input area 206, document number input areas 207 and 208, text areas 209 and 210, and a local alignment display area 211.

First, the text areas 209 and 210 are described. The text areas 209 and 210 display the pair of the target character strings.

The text areas 209 and 210 receive text input from the user through the keyboard/mouse 103. Therefore, the user can freely edit the character strings displayed in the text areas 209 and 210 by using the keyboard/mouse 103.

Further, in the case where the client 10 acquires the target character string from the search server 12, the user inputs the document number of the target character string that the user wants to acquire to the document number input area 207 or 208. Then, when "enter" is input to the document number input area 207 or 208, the client 10 transmits the document number that is input to the document number input area 207 or 208 to the search server 12.

When the document number is received, the search server 12 searches for document corresponding to the received document number and transmit the found document to the client 10. When the document transmitted from the search server 12 is received, the client 10 displays a character string of the received document in the corresponding text area 209 or 210.

It should be noted that, in a case where the local alignment display screen 20 is displayed on the display 104, the local alignment display control module 106 may transmit the document numbers, which are previously input to the document number input areas 207 and 208, to the search server 12.

When the user operates the "enumerate" button 201, the local alignment display control module 106 inputs the target character strings displayed in the text areas 209 and 210 to the local alignment enumeration module 105. Then, the local alignment enumeration module 105 enumerates the local alignments from the input target character strings, and inputs the enumerated local alignments to the local alignment display control module 106.

The local alignment display control module 106 displays the input local alignments on the local alignment display area 211.

It should be noted that, to the match score input box 202, the unmatch score input box 203, the skip score input box 204, the gap input box 205, and the score threshold input area 206, parameters used when the local alignment enumeration module 105 enumerates the local alignments are input. Those parameters are described later in detail with reference to FIGS. 6 to 10.

It should be noted that, when the target character strings are predetermined in the case where the local alignment display screen 20 is displayed on the display 104, the local alignment display control module 106 may automate the operation of the "enumerate" button 201.

Next, the local alignment display area 211 for displaying the local alignments enumerated by the local alignment enumeration module 105 is described.

In the local alignment display area 211, two character strings, which are the target character strings, are expressed by two-dimensional matrices. Specifically, the horizontal axis of the local alignment display area 211 corresponds to the character string input to the text area 209, and the vertical axis of the local alignment display area 211 corresponds to the character string input to the text area 210. On the horizontal axis, the first character is positioned at the left end, and the last character is positioned at the right end. On the vertical axis, the first character is positioned at the upper end, and the last character is positioned at the lower end.

It should be noted that, in FIG. 2, a display region 215 above the local alignment display area 211 displays the character string corresponding to the horizontal axis, and a display region 216 on the left of the local alignment display area 211 displays the character string corresponding to the vertical axis, but the display regions 215 and 216 do not always need to display the character string. For example, when the number of characters of each of the character strings corresponding to the horizontal axis and the vertical axis is equal to or larger than a predetermined number, the local alignment display control module 106 does not display the character strings in the display regions 215 and 216.

The local alignments between the character string corresponding to the vertical axis of the local alignment display area 211 and the character string corresponding to the horizontal axis are shown by rectangles. In FIG. 2, two local alignments are enumerated, and the enumerated local alignments are shown by two rectangles 212A and 212B (hereinafter, collectively denoted as 212).

The position and the length of the vertical side of the rectangle 212 correspond to the range of the local alignments of the character string shown along the vertical axis of the local alignment display area 211, and the position and the length of the horizontal side of the rectangle 212 correspond to the range of the local alignments of the character string shown along the horizontal axis of the local alignment display area 211.

Specifically, the rectangle 212A is a local alignment between the part "特許を検索 (tok-kyo wo ken-saku)" of the character string shown along the horizontal axis of the local alignment display area 211 and the part "特許検索 (tok-kyo ken-saku)" of the character string shown along the vertical axis thereof. The rectangle 212B is a local alignment between the part "精度向上 (sei-do kou-jyou)" of the character string shown along the horizontal axis of the local alignment display area 211 and the part "精度の向上 (sei-do no kou-jyou)" of the character string shown along the vertical axis thereof.

The user may select a particular rectangle 212 from among a plurality of rectangles 212 (local alignments) displayed in the local alignment display area 211 by pointing to the particular rectangle 212 by a mouse pointer 214. It should be noted that the local alignment display control module 106 displays the rectangle 212 selected by the user in such a manner that the user can recognize the selected state. Specifically, the local alignment display control module 106 displays the rectangle 212 selected by the user by highlighting (for example, filling with gray).

Further, the local alignment display control module 106 shows, of the character strings displayed in the text areas 209 and 210, the partial character string corresponding to the rectangle 212 selected by the user in such a manner that the user can recognize that the rectangle 212 corresponding to the partial character string is selected. Specifically, the local alignment display control module 106 displays the partial character string by highlighting (for example, displaying in reverse color).

Thus, the user can find at once the character strings corresponding to the selected rectangle 212 from among the character strings displayed in the text areas 209 and 210 while selecting the rectangle 212 displayed in the local alignment display area 211, and read the portions around the character strings found from the text areas 209 and 210 while comparing the portions.

Further, when the character strings of the local alignment are long, the area of the rectangle 212 becomes large, and hence the user can distinguish the important local alignment at a glance. Generally, the user finds a large rectangle displayed in the local alignment display area 211, selects the rectangle by pointing to the rectangle by the mouse pointer 214, and finds the character strings corresponding to the rectangle from the text areas 209 and 210, to thereby read the character strings and the portions around the character strings.

It should be noted that, when the number of characters of each of the character strings displayed in the text areas 209 and 210 is larger than the predetermined number, the local alignment display control module 106 automatically scrolls the character strings to display the character strings so that the partial character string corresponding to the selected rectangle 212 is positioned at the top of each of the text areas 209 and 210. It should be noted that the predetermined number is set to, for example, a value larger than the number of characters that can be displayed in the text areas 209 and 210 without scrolling.

When the character strings input to the text areas 209 and 210 become longer, the rectangle 212 displayed in the local alignment display area 211 becomes relatively smaller, and hence it becomes difficult for the user to distinguish a rectangle 212 having a small area. Therefore, as illustrated in FIG. 3, a modified example is also possible in which a zoom area 303 for displaying a portion of the local alignment display area 211 in an enlarged state is added.

Figure 3:
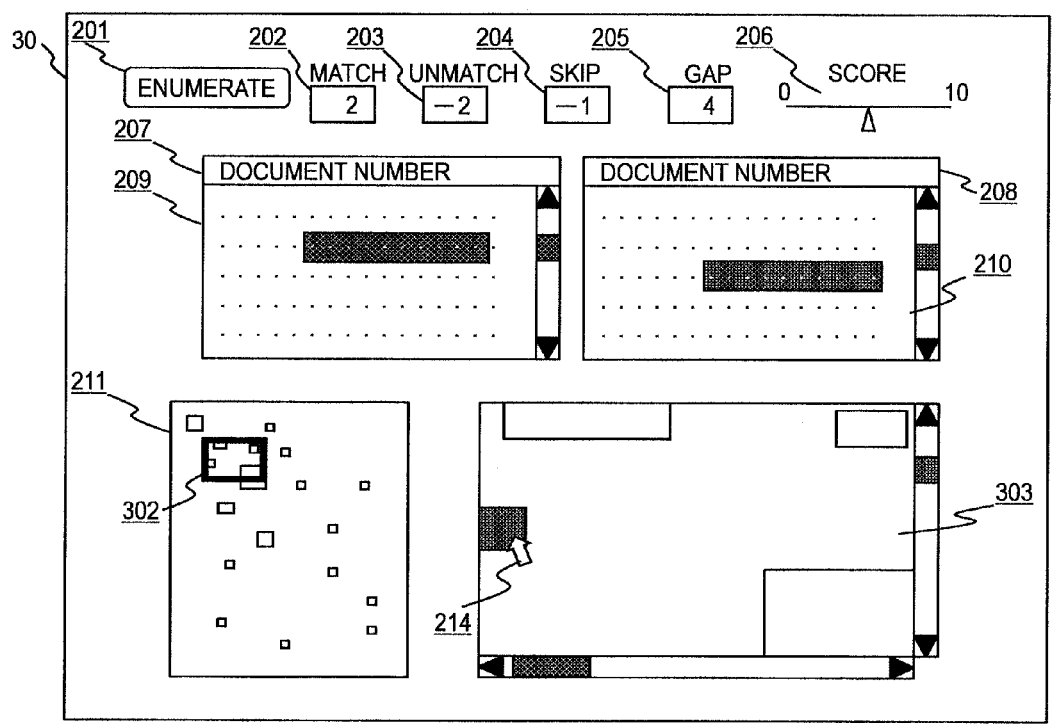
FIG. 3 is an explanatory diagram illustrating a local alignment display screen according to the modified example of the first embodiment of this invention.

FIG. 3 is an explanatory diagram illustrating a local alignment display screen 30 according to the modified example of the first embodiment of this invention.

Of components of the local alignment display screen 30 illustrated in FIG. 3, the same components as those of the local alignment display screen 20 illustrated in FIG. 2 are denoted by the same reference symbols, and a description thereof is omitted.

The local alignment display area 211 illustrated in FIG. 3 is an area for displaying the entire matrix of the target character strings displayed in the text areas 209 and 210.

In the local alignment display area 211, a scope 302 that can be operated by the user with the mouse is displayed. The range that falls in the scope 302 is displayed in the zoom area 303 in an enlarged state. It should be noted that, when the scope 302 is moved, the local alignment display control module 106 updates the display content of the zoom area 303 to a display content corresponding to the moved scope 302.

Figure 4:
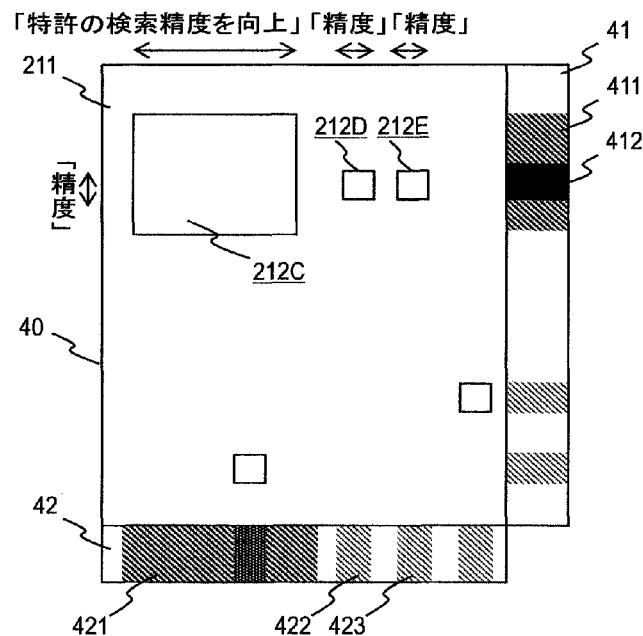
FIG. 4 is an explanatory diagram illustrating a local alignment display screen according to a modified example of the first embodiment of this invention.

FIG. 4 is an explanatory diagram illustrating a local alignment display screen 40 according to a modified example of the first embodiment of this invention.

The local alignment display screen 40 illustrated in FIG. 4 is a screen in which summary bar charts 41 and 42 are added to the local alignment display area 211 illustrated in FIG. 2 or FIG. 3.

The user may want to know at once in which portion the rectangles 212 displayed in the local alignment display area 211 proliferate. The user can recognize to some extent in which portion of the local alignment display area 211 the rectangles 212 proliferate by searching the local alignment display area 211. However, this method is not encompassing.

To address this problem, the local alignment display control module 106 aggregates the distributions in the horizontal direction of the rectangles 212 displayed in the local alignment display area 211 to generate the summary bar chart 41 indicating the distribution in the vertical direction, and generates the summary bar chart 42 indicating the distribution in the horizontal direction of the rectangles 212 displayed in the local alignment display area 211, to thereby display the generated summary bar charts 41 and 42.

The summary bar chart 41 is a bar chart obtained as a result of projecting the rectangles 212 displayed in the local alignment display area 211 in the horizontal direction, and indicates the distribution of the local alignments in the character string in the vertical direction. On the other hand, the summary bar chart 42 indicates the distribution of the local alignments in the character string in the horizontal direction. For example, the rectangle 212C is projected to portions 411 and 412 of the summary bar chart 41. It should be noted that, by displaying the local alignments in darker color as the score is higher, it is possible to attract attention to the local alignments that are important to the user. It should be noted that the score indicates the similarity, and the specific method of calculating the score is described later.

There are many cases where a partial character string in one character string matches a plurality of parts in the other character string. For example, in FIG. 4, the term "精度 (sei-do)" in the character string in the vertical direction appears in three parts in the horizontal direction. Therefore, the part 412 of the summary bar chart 41 that corresponds to the term "精度 (sei-do)" in the vertical direction is displayed in a color that is darker than other parts.

As described above, in the case where the rectangles 212 displayed in the local alignment display area 211 are projected in the row direction and the column direction, when the summary bar charts 41 and 42 are displayed in a darker color in proportion to the sum of the scores of the local alignments positioned in the row direction and the column direction, the user can find at once the portion where a local alignment having a high score exists and the portion where a large number of local alignments exist simply by glancing at the summary bar charts 41 and 42.

Hereinafter, summary bar chart generation processing is described. The summary bar chart generation processing is executed by the local alignment display control module 106.

It should be noted that the summary bar chart generation processing by the local alignment display control module 106 is executed after the local alignments enumerated by the local alignment enumeration module 105 are input to the local alignment display control module 106.

Here, the local alignments have a start point and an end point. The start point corresponds to coordinates (br, bc) of the upper left point of the rectangle 212 displayed in the local alignment display area 211, and the end point corresponds to coordinates (er, ec) of the lower right point of the rectangle 212. Further, the score of the local alignment is denoted by S, and the score of the local alignment having the maximum score among all the rectangles 212 (local alignments) displayed in the local alignment display area 211 is denoted by Smax.

First, the local alignment display control module 106 determines a transparency of each local alignment based on the score S of the local alignment and the maximum score Smax. The transparency is expressed as 0 to 255. When the transparency is 0, the local alignment is totally transparent, and when the transparency is 255, the local alignment is totally opaque.

The transparency of each local alignment is determined so that as the score S of the local alignment becomes higher, the local alignment becomes more opaque. This way, the local alignments having higher scores S are displayed in darker color in the summary bar charts 41 and 42, thereby attracting more attention of the user.

Specifically, when a transparency Tmax of the local alignment having the maximum score Smax is preset, the local alignment display control module 106 determines transparencies T of local alignments by equal distribution based on the transparency Tmax. In other words, the local alignment display control module 106 determines the transparency T by calculating Tmax*(S/Smax).

Next, the local alignment display control module 106 fills the range from the y coordinate bc of the start point of the rectangle 212 to the y coordinate ec of the end point in the summary bar chart 41 with the transparency T of the local alignment of the rectangle 212. Further, the local alignment display control module 106 fills the range from the x coordinate br of the start point of the rectangle 212 to the x coordinate er of the end point in the summary bar chart 42 with the transparency T of the local alignment of the rectangle 212. The local alignment display control module 106 executes the processing on all the local alignments. Here, with regard to a part where the local alignments overlap in the summary bar charts 41 and 42, the local alignment display control module 106 adds the transparencies T of the overlapping local alignments and fills the part with the added transparencies, and hence the part is displayed in a dark color.

It should be noted that, in the processing described above, the transparency T of each local alignment is a value that is proportional to the score of the local alignment. Therefore, dark color parts in the summary bar charts 41 and 42 are where the local alignments corresponding to the parts have high scores, or where the local alignments overlap. In either case, the dark color parts in the summary bar charts 41 and 42 indicate existence of local alignments that are important to the user. However, the user may want to know only parts where the local alignments overlap from the viewpoint that, because the local alignments having high scores correspond to the rectangles 212 having large areas in the local alignment display area 211, the user can easily find the local alignments having the high scores, but the local alignments overlapping in the vertical direction and the horizontal direction are hard to find in the local alignment display area 211.

Therefore, instead of determining the score S of the local alignment by using the transparency T of the local alignment, the local alignment display control module 106 may set the transparencies T of all the local alignments to a predetermined value, and when the local alignments overlap in the vertical direction or the horizontal direction, add the transparencies T of the overlapping local alignments to fill the part with the added transparencies.

Accordingly, color densities of the summary bar charts 41 and 42 do not depend on the score but on the number of the overlapping local alignments, and hence it becomes easier for the user to find the local alignments overlapping in the vertical direction and the horizontal direction in the local alignment display area 211.

Next, processing of enumerating the local alignments by the local alignment enumeration module 105 is described.

In enumerating the local alignments, as described above, the problem is to enumerate only representative local alignments exhaustively. This invention solves the above-mentioned problem by incorporating pruning by start point match into the existing Smith-Waterman method.

Figure 5:
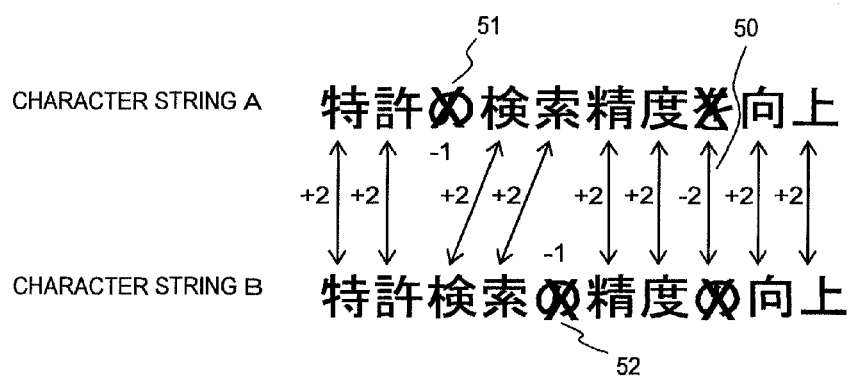
FIG. 5 is an explanatory diagram illustrating scores between two character strings according to the first embodiment of this invention.

FIG. 5 is an explanatory diagram illustrating scores between two character strings according to the first embodiment of this invention.

Characters are associated between a character string A "特許の検 索精度を向上 (tok-kyo no ken-saku sei-do wo kou-jyou)" and a character string B "特許検索 の 精度の向上 (tok-kyo ken-saku no sei-do no kou-jyou)". The association on a character basis is called "alignment". The alignments include match alignments in which associated characters match and unmatch alignments in which associated characters do not match. In FIG. 5, an alignment 50 between "を (wo)" and "の (no)" is an unmatch alignment, and other alignments are match alignments.

Not all characters align between the character string A and the character string B. In FIG. 5, the character "の (no)" (51) in the character string A and the character "の (no)" (52) in the character string B are not associated with any character. The characters that are not aligned mean that the characters are skipped, which is hereinafter called "skip".

Predetermined values are set in advance to the match alignment, the unmatch alignment, and the skip. In FIG. 5, +2 points are set to the match alignment, −2 points are set to the unmatch alignment, and −1 point is set to the skip. In this case, the values between the character string A and the character string B are summed up to the value (score) of 12 points, and this score is the similarity between the character string A and the character string B.

Further, the local alignments are pairs of partial character strings that give local high scores in the target character strings, and are enumerated by the local alignment enumeration module 105. The local alignment enumeration module 105 enumerates different local alignments depending on the values set to the match alignment, the unmatch alignment, and the skip.

It should be noted that the user can set desired values to the values of the match alignment, the unmatch alignment, and the skip through the match score input box 202, the unmatch score input box 203, and the skip score input box 204 illustrated in FIG. 2.

Further, the value of the unmatch alignment may be different depending on the type of the character of the unmatch alignment. For example, the value in a case where the type of the character of the unmatch alignment is a particle may be set lower than the value in a case where the character of the unmatch alignment is of a type other than a particle.

Further, because it is highly likely that a partial character string appearing many times in the character strings is important to the user, the score may include the number of appearances so that the local alignment enumeration module 105 can recognize the number of appearances. This way, the local alignment enumeration module 105 multiplies the score of a partial character string having the number of appearances equal to or larger than a predetermined value by the predetermined value of 1 or larger so that the score becomes higher than the score of a partial character string having the number of appearances smaller than the predetermined value.

In this embodiment, the Smith-Waterman method is used when the local alignment enumeration module 105 calculates the scores of the target character strings so as to enumerate the local alignments. The Smith-Waterman method is a method of calculating the scores efficiently by dynamic programming.

Hereinafter, the method of calculating the scores according to this embodiment is described with reference to FIG. 6.

Figures 6, 7:
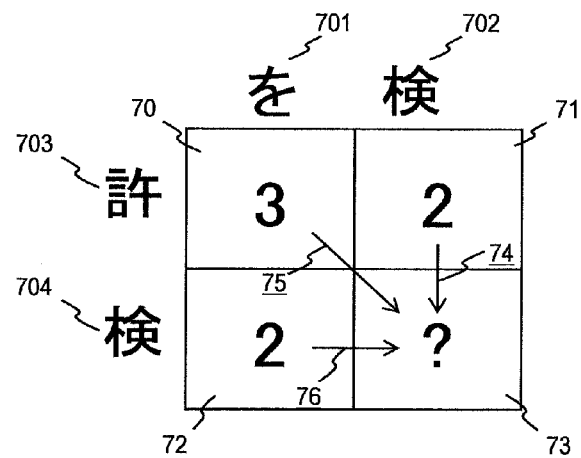
FIG. 6 is an explanatory diagram illustrating a score matrix according to the first embodiment of this invention.
FIG. 7 is an explanatory diagram illustrating a method of calculating the score according to the first embodiment of this invention.

FIG. 6 is an explanatory diagram illustrating a score matrix according to the first embodiment of this invention.

The local alignment enumeration module 105 positions one of the two target character strings in a row, and the other target character string in a column. Then, the local alignment enumeration module 105 calculates scores of cells of the matrix sequentially from the cell at the upper left corner and registers the calculated scores in the cells, to thereby generate the score matrix.

It should be noted that a cell of the matrix is associated with a character in the row corresponding to the cell and a character in the column corresponding to the cell. Further, the score registered in each cell is a total value of scores up to the cell.

Next, referring to FIG. 7, the method of calculating the score is described.

FIG. 7 is an explanatory diagram illustrating the method of calculating the score according to the first embodiment of this invention.

When a score of a cell is calculated, the local alignment enumeration module 105 calculates a score for each path from a cell which is adjacent to the cell to be calculated and for which the score is already calculated to the cell to be calculated, and registers the maximum score of the calculated scores in the cell to be calculated.

Hereinafter, a case where the score of a cell 73 of FIG. 7 is calculated is specifically described.

Cells which are adjacent to the cell 73 and for which scores are already calculated are cells 70, 71, and 72. A path from the cell 71 located immediately above the cell 73 is a first path 74, a path from the cell 70 located to the upper left of the cell 73 is a second path 75, and a path from the cell 72 located to the left of the cell 73 is a third path 76.

First, the score of the cell 73 obtained via the first path 74 is described.

Characters corresponding to the cell 71 located immediately above the cell 73 to be calculated are "検 (ken)" (702) and "許 (kyo)" (703), and characters corresponding to the cell 73 are "検 (ken)" (702) and "検 (ken)" (704). From the cell 71, the character "検 (ken)" (704) is skipped. In other words, the character "検 (ken)" (702) does not change, and hence in the path from the cell immediately above to the cell to be calculated, the characters in the row do not change but the characters in the column change, which means the skipping (skip) of the character "検 (ken)" (704) in the column.

Here, the value "−1" is set in advance to the skip, and hence the score of the cell 73 obtained via the first path 74 is calculated by adding the value "−1" set to the first path 74 (value set to the skip) to the value "2" of the score of the cell 71, which gives the value "1".

Next, the score of the cell 73 obtained via the third path 76 is described.

Characters corresponding to the cell 72 located to the left of the cell to be calculated 73 are "を (wo)" (701) and "検 (ken)" (704), and characters corresponding to the cell 73 are "検 (ken)" (702) and "検 (ken)" (704). From the point of the cell 70, the character "検 (ken)" (702) is skipped. In other words, in the path from the cell to the left to the cell to be calculated, the characters in the column do not change but the characters in the row change, which means the skipping (skip) of the character "検 (ken)" (702) in the row.

Here, the value "−1" is set in advance to the skip, and hence the score of the cell 73 obtained via the third path 76 is calculated by adding the value "−1" set to the third path 76 (value set to the skip) to the value "2" of the score of the cell 72, which gives the value "1".

Next, the score of the cell 73 obtained via the second path 75 is described.

Characters corresponding to the cell 70 located to the upper left are "を (wo)" (701) and "許 (kyo)" (703), and characters corresponding to the cell 73 are "検 (ken)" (702) and "検 (ken)" (704). In this case, the character in the row and the character in the column corresponding to the cell 70 located to the upper left and the character in the row and the character in the column corresponding to the cell 73 are different, and hence a skip does not occur. The second path 75 implies the match alignment when the character in the row and the character in the column corresponding to the cell 73 match, and implies the unmatch alignment when the character in the row and the character in the column corresponding to the cell 73 do not match. It should be noted that, in FIG. 7, the character "検 (ken)" (704) in the row and the character (702) in the column corresponding to the cell 73 match, and hence the second path 75 implies the match alignment.

Here, the value "2" is set in advance to the match alignment, and the value "−2" is set in advance to the unmatch alignment. The score of the cell 73 obtained via the second path 75 is calculated by adding the value "2" set to the match alignment to the value "3" of the score of the cell 70, which gives "5".

As described above, the scores of the cell 73 obtained via the first path 74 to the third path 76 are calculated. Then, the path having the maximum score of the calculated scores is selected, and the maximum score is registered in the cell 73. In FIG. 7, the score "5" obtained via the second path 75 is the maximum, and hence the score "5" is registered in the cell 73.

As described above, the local alignment enumeration module 105 registers the scores sequentially in the horizontal direction from the cell at the upper left corner illustrated in FIG. 6. Then, when the scores are registered in all the cells in one row, the local alignment enumeration module 105 registers the scores sequentially from the cell at the left end of the next row. Therefore, the scores of the cells immediately above, to the upper left of, and to the left of the cell to be calculated are always registered.

Further, as initialization processing, the local alignment enumeration module 105 inserts a column before the first character of the target character string ("精度向上 の 特許を検索 (sei-do kou-jyou no tok-kyo wo ken-saku)" illustrated in FIG. 6) corresponding to the row, and a row before the first character of the target character string ("特許検索 の 精度の向上 (tok-kyo ken-saku no sei-do no kou-jyou)" illustrated in FIG. 6) corresponding to the column. The inserted row and column are called an initial row and column. Then, the local alignment enumeration module 105 registers in advance the score "0" in the cells in the initial row and column.

Next, a problem of the conventional local alignment enumeration processing using the Smith-Waterman method is described.

After the score matrix illustrated in FIG. 6 is generated by the method of calculating the score described with reference to FIG. 7, a cell in which the maximum score is registered is selected from the cells of the score matrix. By tracking back the path to the selected cell, the local alignment having the maximum score is enumerated.

In FIG. 6, the maximum score is "7", and cells in which the maximum score is registered are cells 60 and 61. By tracking back the path from the cell 60, a character string "特許を検索 (tok-kyo wo ken-saku)" is enumerated from the target character string ("精度向上 の 特許を検索 (sei-do kou-jyou no tok-kyo wo ken-saku)"), and by tracking back the path from the cell 61, a character string" 特許検索 (tok-kyo ken-saku)" is enumerated from the target character string ("特許検索 の 精度の向上 (tok-kyo ken-saku sei-do no kou-jyou)"). It should be noted that the character strings "特許を検索 (tok-kyo wo ken-saku)" and "特許検索 (tok-kyo ken-saku)" are local alignments.

In this case, only the local alignments having the maximum score in the score matrix can be enumerated, and local alignments having scores lower than the maximum score cannot be enumerated. For example, in FIG. 6, if the score of the local alignments "特許を検索 (tok-kyo wo ken-saku)" and "特許検索 (tok-kyo ken-saku)" is "7" and the score of the local alignments "精度向上 (sei-do kou-jyou)" and "精度の向上 (sei-do no kou-jyou)" is "6", the local alignments "精度向上 (sei-do kou-jyou)" and "精度の向上 (sei-do no kou-jyou)" are not enumerated. Therefore, in the method involving tracking back the paths from the cells in which the maximum score is registered after the score matrix is generated, only the single representative local alignment is enumerated, and the local alignments cannot be enumerated exhaustively.

To address this problem, a possible method is to enumerate cells having scores that are equal to or larger than a predetermined value and track back paths from the enumerated cells, to thereby enumerate the local alignments. With this method, the local alignments can be enumerated exhaustively, but the enumerated local alignments include duplicates, and hence the enumerated local alignments are redundant and not representative.

In FIG. 6, when the predetermined value of the score of the cells to be enumerated is set to "6", cells 62 and 63 are enumerated. In this case, the local alignments enumerated by tracking back the path from the cell 62 are character strings "特許を検索 (tok-kyo wo ken-saku)" and "特許検索 の (tok-kyo ken-saku no)". The character string "特許検索 の (tok-kyo ken-saku no)" is a character string obtained by merely adding the character "の (no)" to the end of the character string "特許検索 (tok-kyo ken-Baku)", which should originally be enumerated as the local alignment corresponding to the character string "特許を検索 (tok-kyo wo ken-saku)", and is merely a variation of the original local alignment "特許検索 (tok-kyo ken-saku)".

The last character of the character string that is enumerated as the original local alignment is a character corresponding to the cell having the maximum score. This is because, when settings are made so that the score is increased for the match alignment and the score is decreased for the unmatch alignment and the skip, the score is increased when the characters in the two target character strings match and the score is decreased otherwise. Therefore, the character having the score that is not decreased and is the maximum is the last character of the character string to be enumerated as the original local alignment.

In the method described above, the character corresponding to a cell around the cell having the maximum score may in some cases be enumerated as the last character of the local alignment, which is a mere variation of the original local alignment, and the enumerated local alignments become redundant.

In this embodiment, when the score calculated when the score matrix is generated is higher than the maximum score in the local alignment to which the cell having the calculated score belongs, the local alignment enumeration module 105 registers the cell having the calculated score as the end point of the local alignment. It should be noted that cells constituting the local alignment to which the cell having the calculated score belongs are cells through which all paths from the same start point as the start point of the path to the calculated score pass. This processing is referred to as pruning by start point match.

This allows non-duplicate local alignments to be enumerated exhaustively without enumerating variations of the original local alignment.

It should be noted that, when the target character string becomes long and the size of the score matrix becomes large, when the pruning by start point match is executed after the score matrix is generated, the amount of calculation for searching for paths having the same start point is increased. Therefore, in this embodiment, the local alignment enumeration processing with pruning by start point match is executed at the same time when the score matrix is generated, and hence the local alignments can be enumerated with substantially the same amount of calculation as the local alignment enumeration processing by the Smith-Waterman method.

Referring to FIGS. 8 to 11, the local alignment enumeration processing according to this embodiment is described.

FIG. 8 is an explanatory diagram illustrating the initialization processing according to the first embodiment of this invention.

The initialization processing is executed by the local alignment enumeration module 105.

First, the local alignment enumeration module 105 registers two target character strings, and sets a match score, an unmatch score, and a skip score (S801).

Specifically, the two target character strings are expressed by an array X[1 . . . 1x] and an array Y[1 . . . 1y]. For convenience, the first character in each target character string is registered in element 1 of each array. Further, lengths of the target character strings are 1x and 1y, respectively.

Further, the local alignment enumeration module 105 sets values input to the match score input box 202, the unmatch score input box 203, and the skip score input box 204 illustrated in FIG. 2 to the match score (Match), the unmatch score (Unmatch), and the skip score (Skip), respectively.

Next, the local alignment enumeration module 105 initializes the score matrix (S802). The score matrix is a matrix described with reference to FIG. 6, and is expressed as M[0 ... 1x][0 ... 1y]. [0 ... 1x] corresponds to the target character string expressed by the array X, and [0 ... 1y] corresponds to the target character string expressed by the array Y.

Further, a cell corresponding to the i-th character X[i] of the array X and the j-th character Y[j] of the array Y is M[i][j]. In each cell of the score matrix, a total value of scores along the path leading to the cell is registered as in the case of FIG. 6. Further, the local alignment enumeration module 105 registers the score "0" in the cells in the 0th row and the 0th column in the score matrix.

Next, the local alignment enumeration module 105 initializes a local alignment (S803). The local alignment is expressed by the following three arrays: a start point array B; an end point array E; and a score array S. An ID serving as a unique identifier of the local alignment corresponds to an index of the arrays.

In the start point array B, coordinates of the start point of each local alignment are registered, and in the end point array E, coordinates of the end point of each local alignment are registered. As used herein, the coordinates refer to a pair of indices of the score matrix. For example, when the i-th character X[i] of the array X and the j-th character Y[j] of the array Y constitute a start point, the coordinates of the start point are (i, j).

In the score array S, the score of each local alignment is registered. In the score array S, 0 is registered as an initial value.

The local alignment having the ID of i is expressed by a start point array B[i], an end point array E[i], and a score array of S[i].

In this embodiment, as information regarding the local alignment, start point information, end point information, and score information are stored, but path information (alignment) of the local alignments may also be stored.

Figure 9:
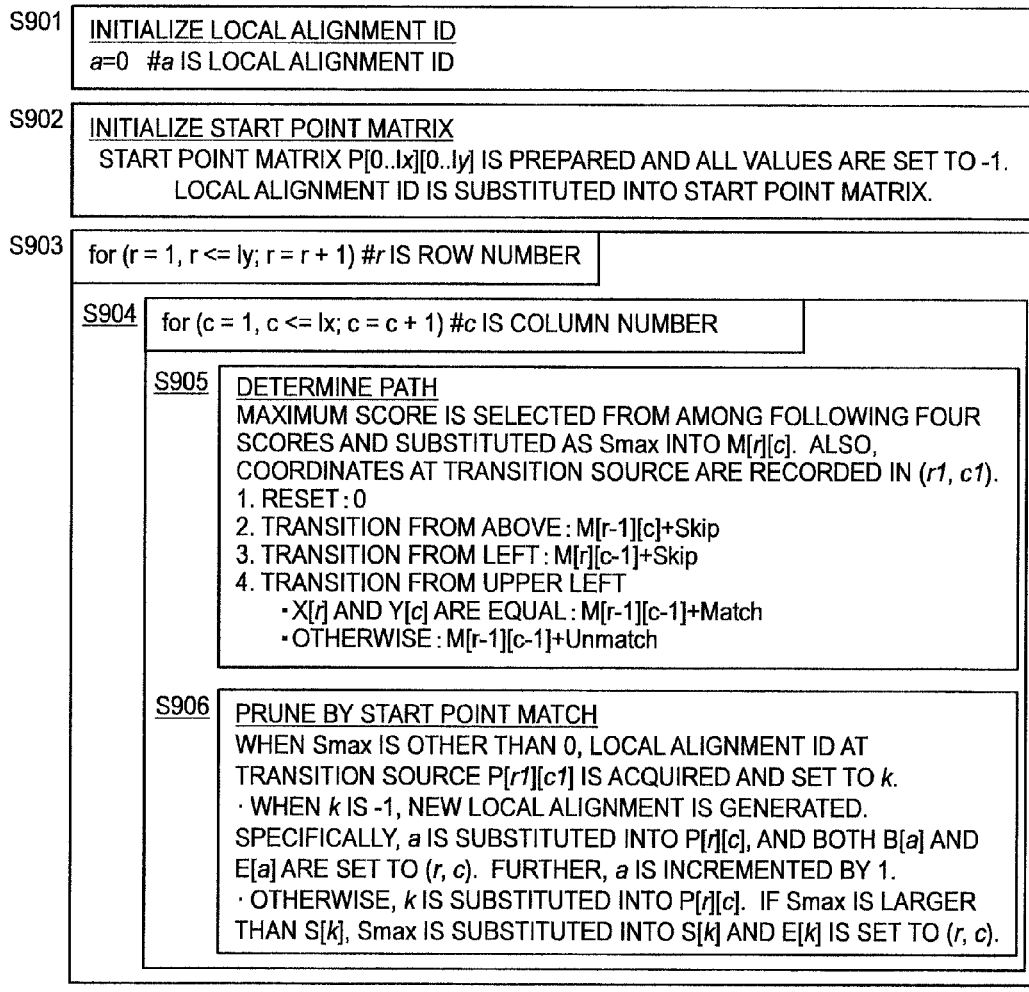
FIG. 9 is an explanatory diagram illustrating local alignment collection processing according to the first embodiment of this invention.

FIG. 9 is an explanatory diagram illustrating local alignment collection processing according to the first embodiment of this invention.

The local alignment enumeration module 105 executes the local alignment collection processing after executing the initialization processing illustrated in FIG. 8.

First, the local alignment enumeration module 105 initializes a variable a in which the ID of the local alignment is registered to 0 (S901).

As described above, the local alignment ID corresponds to the index of the start point array B, the end point array E, and the score array S of the local alignment. In S901, no local alignment has been enumerated, and hence the local alignment enumeration module 105 initializes the local alignment ID to 0.

Next, the local alignment enumeration module 105 initializes a start point matrix illustrated in FIG. 10 (S902). Cells of the start point matrix correspond to the cells of the score matrix, and in the cells of the start point matrix, the ID of the local alignment to which the cells belong is registered.

In S902, the local alignment enumeration module 105 registers an initial value "−1" to all the cells in the start point matrix. The ID "−1" of the local alignment of the start point matrix means that the cell does not belong to any local alignment.

Next, referring to FIG. 10, the start point matrix is described. FIG. 10 is an explanatory diagram illustrating the start point matrix according to the first embodiment of this invention.

The coordinates of each cell of the start point matrix are the same as the coordinates of the score matrix illustrated in FIG. 6, and in each cell, the ID of the local alignment to which the cell belongs is registered. It should be noted that, as described above, the initial value "−1" is registered in each cell, and hence the cell in which the value "−1" is registered does not belong to any local alignment.

Next, the local alignment enumeration module 105 selects a row of the score matrix to be processed (S903).

Specifically, the local alignment enumeration module 105 selects, from among rows of the score matrix, a row corresponding to the first character of the target character string (row corresponding to the first index of the array Y) as the row to be processed, and executes processing of S904 to S906 on the row to be processed. After the processing of S904 to S906 is executed, the local alignment enumeration module 105 selects the row next to (the row below) the selected row as the row to be processed. The local alignment enumeration module 105 repeatedly executes the processing of S904 to S906 until all the rows are processed.

Next, the local alignment enumeration module 105 selects a column to be processed from columns included in the row to be processed (S904).

Specifically, the local alignment enumeration module 105 selects, from among the columns included in the row to be processed, a column corresponding to the first character of the target character string (column corresponding to the first index of the array X) as the column to be processed, and executes processing of S905 and S906 on the column to be processed. After the processing of S905 and S906 is executed, the local alignment enumeration module 105 selects the column next to (the column to the right of) the selected column as the column to be processed. The local alignment enumeration module 105 repeatedly executes the processing of S905 and S906 until all the columns in the row to be processed are processed.

In the processing of S903 and S904, the cell to be processed in the processing of S905 and 906 (hereinafter, referred to as the cell to be processed) is determined from the cells of the score matrix, and the processing of S905 and 906 is executed on all the cells of the score matrix.

Next, the local alignment enumeration module 105 calculates a score of the cell to be processed (S905).

Specifically, the local alignment enumeration module 105 calculates scores of paths 1 to 4 of S905 of FIG. 9, selects the maximum score (Smax) from the calculated scores, and registers the selected maximum score in the cell (M[r][c]) to be processed. In this case, the local alignment enumeration module 105 stores the coordinates of the cell at the transition source in the path as (r1, c1).

Hereinafter, the paths 1 to 4 of S905 of FIG. 9 are described.

The path 1 of S905 is provided to prevent the maximum value of the score from becoming a minus value and has a score set to "0".

The path 2 of S905 is a transition from the cell (r−1, c) located immediately above the cell (r, c) to be processed and corresponds to a skip of a character in the vertical direction. The score of the cell to be processed in this case is calculated by adding the skip score (Skip) to the score (M[r−1], [c]) of the cell (r−1, c) at the transition source.

The path 3 of S905 is a transition from the cell (r, c−1) located to the left of the cell (r, c) to be processed and corresponds to a skip of a character in the horizontal direction. The score of the cell to be processed in this case is calculated by adding the skip score (Skip) to the score (M[r], [c−1]) of the cell (r,c−1) at the transition source.

The path 4 of S905 is a transition from the cell (r−1, c−1) located to the upper left of the cell (r, c) to be processed, and the score to be calculated is different depending on whether or not two characters (array X[r] and array Y[c]) corresponding to the cell to be processed match.

The score of the cell to be processed in a case where the two characters corresponding to the cell to be processed match is calculated by adding the match score (Match) to the score (M[r−1], [c−1]) of the cell (r−1, c−1) at the transition source.

On the other hand, the score of the cell to be processed in a case where the two characters corresponding to the cell to be processed do not match is calculated by adding the unmatch score (Unmatch) to the score (M[r−1], [c−1]) of the cell (r−1, c−1) at the transition source.

In S905, the score is registered in the cell of the score matrix, and hence S905 is called score matrix generation processing.

Next, the local alignment enumeration module 105 executes pruning processing of determining, based on the maximum score Smax of the cell to be processed, which is calculated in S905, whether or not the coordinates of the cell to be processed are set to the end point of the local alignment (S906).

Hereinafter, the pruning processing is described in detail.

First, the local alignment enumeration module 105 judges whether or not the maximum score Smax of the cell to be processed, which is calculated in S905, is "0".

When the maximum score Smax of the cell to be processed, which is calculated in S905, is "0", the character corresponding to the cell does not belong to the local alignment, and hence the local alignment enumeration module 105 returns to the processing of S904 and selects the next column to be processed.

When, on the other hand, the maximum score Smax of the cell to be processed, which is calculated in S905, is not "0", the local alignment enumeration module 105 acquires the local alignment ID registered in the cell at the transition source of the start point matrix illustrated in FIG. 10. Specifically, the local alignment enumeration module 105 acquires the local alignment ID (P[r1][c1]) registered in the cell corresponding to the coordinates (r1, c1), which is the cell at the transition source, of the cells of the start point matrix. It should be noted that the local alignment enumeration module 105 stores the acquired local alignment ID as k.

Then, the local alignment enumeration module 105 judges whether or not the acquired local alignment ID of the cell at the transition source is "−1".

When the acquired local alignment ID of the cell at the transition source is "−1", a new local alignment starts from the cell to be processed, and hence the local alignment enumeration module 105 sets the new local alignment.

Specifically, the local alignment enumeration module 105 registers a new local alignment ID(a) in the local alignment ID (P[r][c]) of the cell corresponding to the coordinates (r, c), which is the cell to be processed, of the cells of the start point matrix. Further, the local alignment enumeration module 105 registers the coordinates (r, c) of the cell to be processed in a start point array B[a] and an end point array E[a]. Then, the local alignment enumeration module 105 increments the new local alignment ID(a). In this way, the new local alignment ID(a) is incremented when a local alignment is found in preparation for a new local alignment.

When, on the other hand, the acquired local alignment ID of the cell at the transition source is not "−1", the cell to be processed belongs to the same local alignment as the cell at the transition source, and hence the local alignment enumeration module 105 registers, in the cell corresponding to the coordinates (r, c), which is the cell to be processed, of the cells of the start point matrix, the same local alignment ID(k) as the cell at the transition source. In other words, in the local alignment ID(P[r][c]) of the cell of the start point matrix, the local alignment ID(P[r1][c1]) of the cell at the transition source is registered.

Then, the local alignment enumeration module 105 acquires the score (maximum local alignment score) registered in a score array S[k] of the local alignment ID(k) of the cell at the transition source, and judges whether or not the maximum score (Smax) of the cell to be processed is higher than the maximum local alignment score (S[k]).

When it is judged that the maximum score (Smax) of the cell to be processed is higher than the maximum local alignment score (S[k]), the local alignment enumeration module 105 registers the coordinates (r, c) of the cell to be processed in an end point array E[k] in order to set the cell to be processed to the end point, and also registers the maximum score of the cell to be processed in the score array S[k].

When it is judged, on the other hand, that the maximum score (Smax) of the cell to be processed is equal to or smaller than the maximum local alignment score (S[k]), the local alignment enumeration module 105 returns to the processing of S904 to select the next column to be processed.

It should be noted that, in S906, the ID of the local alignment to which the cell belongs is registered in the cell of the start point matrix, and hence S906 is called start point matrix generation processing.

Through the above-mentioned steps, the local alignment enumeration module 105 collects the local alignments while calculating the score of each cell of the score matrix. It should be noted that the start point, the end point, and the maximum local alignment score of each local alignment are stored in the start point array B, the end point array E, and the score array S, respectively. With this configuration, in the local alignment enumerated by the local alignment enumeration module 105, the character having the maximum score in the local alignment having the identical start point is set to the end point, and hence the representativeness is ensured.

Figure 11:
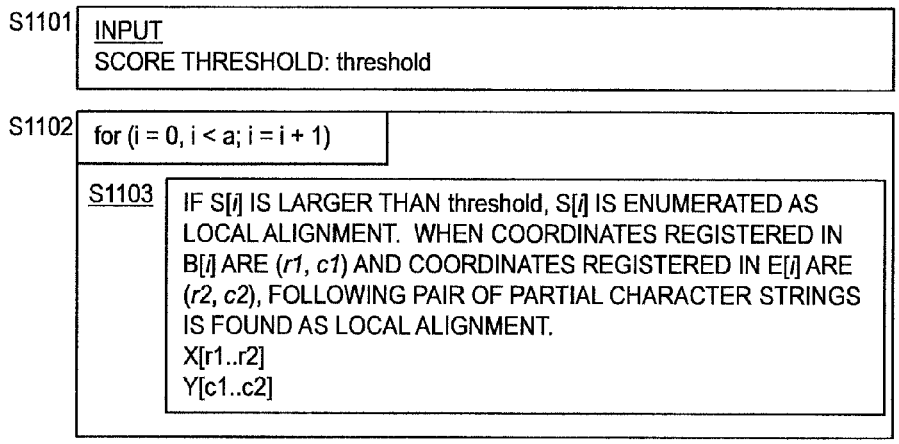
FIG. 11 is a flow chart illustrating the local alignment enumeration processing according to the first embodiment of this invention.

FIG. 11 is a flow chart illustrating the local alignment enumeration processing according to the first embodiment of this invention.

The local alignment enumeration processing is processing executed by the local alignment enumeration module 105 after the local alignment collection processing illustrated in FIG. 9 is executed, and is processing of enumerating the local alignments having the maximum local alignment score that is larger than the predetermined value of the local alignments collected in the local alignment collection processing.

First, the local alignment enumeration module 105 receives an input of a score threshold that is input to the score threshold input area 206 illustrated in FIGS. 2 and 3, and stores the received score threshold as a threshold (S1101).

Next, the local alignment enumeration module 105 selects the ID of the local alignment to be processed in S1103 (S1102). Here, the ID selected in the processing of S1102 as the ID of the local alignment to be processed is "i".

Specifically, the local alignment enumeration module 105 sequentially selects the local alignment IDs from "0", and repeats the processing of S1103 until the local alignment having the local alignment ID "a" is processed.

Next, the local alignment enumeration module 105 judges whether or not the maximum local alignment score of the local alignment identified by the local alignment ID selected in the processing of S1102 is larger than the score threshold.

Specifically, the local alignment enumeration module 105 judges whether or not the maximum local alignment score registered in a score array S[i] corresponding to the local alignment ID "i" selected in the processing of S1102 is larger than the score threshold.

When it is judged that the maximum local alignment score of the local alignment identified by the local alignment ID selected in the processing of S1102 is larger than the score threshold, the local alignment enumeration module 105 enumerates the local alignment identified by the local alignment ID as a local alignment (S1103).

For example, when the local alignment identified by the local alignment ID "i" is enumerated as a local alignment, the coordinates of a start point array B[i] of the enumerated local alignment are (r1, c1), and the coordinates of an end point array EN are (r2, c2), a partial character string indicated by the array X[r1 . . . r2] of one target character string and a partial character string indicated by the array Y[c1 . . . c2] of the other target character string are the local alignments.

Therefore, the local alignment enumeration module 105 enumerates the local alignment having the maximum local alignment score that is larger than the predetermined value, and the enumerated local alignment is displayed by the local alignment display control module 106. Here, the local alignment having a low maximum local alignment score has a short distance between the coordinates of the start point and the coordinates of the end point (in other words, the local alignment has a small area), and the local alignment having a high maximum local alignment score has a long distance between the coordinates of the start point and the coordinates of the end point (in other words, the local alignment has a large area). Therefore, when the local alignment enumeration processing illustrated in FIG. 11 is executed, the local alignment display control module 106 does not display a local alignment that has too small an area in the local alignment display area 211 illustrated in FIG. 2, to thereby prevent the display in the local alignment display area 211 from being complicated.

It should be noted that, in this embodiment, the local alignment enumeration module 105 executes the local alignment enumeration processing illustrated in FIG. 11, but the local alignment display control module 106 may execute the local alignment enumeration processing instead. Specifically, the local alignment enumeration module 105 enumerates all the local alignments collected in the local alignment collection processing illustrated in FIG. 9 as local alignments. Then, the local alignment display control module 106 may execute the local alignment enumeration processing illustrated in FIG. 11 on the enumerated local alignments, to thereby display only the local alignments having the maximum local alignment score that is larger than the score threshold.

(Second Embodiment)

Hereinafter, referring to FIGS. 12 to 15, a second embodiment of this invention is described.

This embodiment is an embodiment in which processing for improving the exhaustiveness (maximum gap length restriction processing) is added to the local alignment processing according to the first embodiment.

Figure 12:
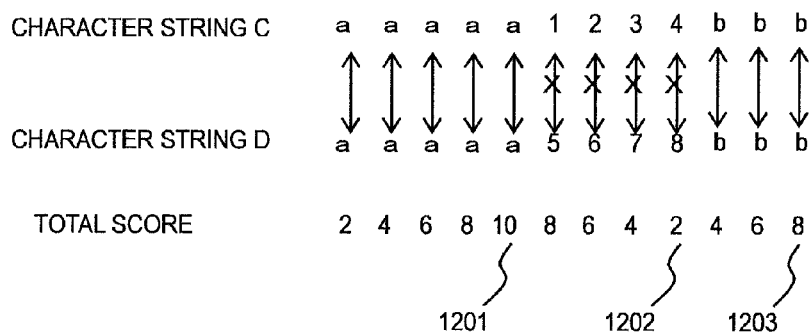
FIG. 12 is an explanatory diagram in case where a local alignment is not enumerated when a local alignment processing of the first embodiment of this invention is executed between two character strings.

First, a case where a desired local alignment cannot be enumerated with the local alignment processing according to the first embodiment is described. FIG. 12 is an explanatory diagram in the case where a local alignment is not enumerated when the local alignment processing of the first embodiment of this invention is executed between two character strings.

Referring to FIG. 12, a case where a local alignment is to be enumerated between a character string C "aaaaa1234bbb" and a character string D "aaaaa5678bbb" in the local alignment processing according to the first embodiment is described.

In this case, it is intuitively expected that character strings "aaaaa" and "bbb", which are common between the character string C and the character string D, are enumerated as the local alignments.

However, with the local alignment collection processing according to the first embodiment illustrated in FIG. 9, only "aaaaa" is enumerated as the local alignment.

This is described below in detail.

The part "aaaaa" matches between the character string C and the character string D, and hence the score of the fifth "a" is "10" (1201). After that, the part "1234" of the character string C and the part "5678" of the character string D do not match, and hence the score decreases by "−2" for each character, and the score corresponding to the character "4" of the character string C and the character "8" of the character string D becomes "2" (1202). Then, the part "bbb" matches between the character string C and the character string D, and hence the score for the third "b" becomes "8".

Here, as described above, in S905 illustrated in FIG. 9, when the maximum score Smax of the cell to be processed is larger than 0 and when the local alignment ID of the cell at the transition source of the cell to be processed is "−1", a new local alignment starts from the cell to be processed. In S905 illustrated in FIG. 9, when the maximum score Smax of the cell to be processed is 0, the local alignment enumeration module 105 performs no processing on the cell, and hence the initial value "−1" remains registered in the cell to be processed of the start point matrix.

Therefore, in the local alignment collection processing illustrated in FIG. 9, only when the maximum score of the cell to be processed is larger than 0 and when the maximum score Smax of the cell at the transition source is 0, a new local alignment starts. In other words, once the maximum score of the cell becomes larger than 0, the cells belong to the same local alignment until a cell having the maximum score of 0 appears.

Therefore, once the maximum score becomes high, even when a new local alignment exists in the course up to the point where the maximum score becomes 0, the new local alignment cannot be enumerated and hence is concealed.

In FIG. 12, the score "10" of 1201 is not attenuated to "0" by the first "b", and hence the character string "bbb" cannot be enumerated as a new local alignment.

Figure 13:
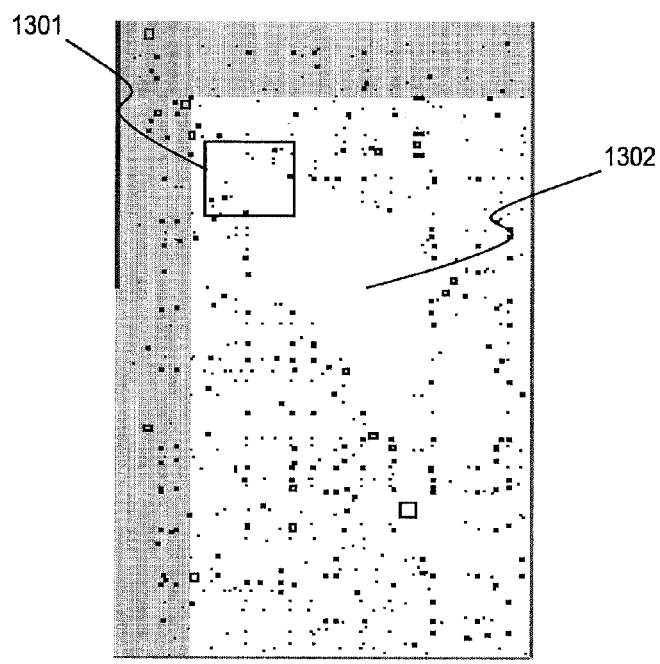
FIG. 13 is a display example of the local alignments enumerated by executing the local alignment processing of the first embodiment on two closely resembling documents.

FIG. 13 is a display example of the local alignments enumerated by executing the local alignment processing of the first embodiment on two closely resembling documents.

The local alignments enumerated in the local alignment processing are displayed by the local alignment display control module 106 as a two-dimensional map in the local alignment display area 211 illustrated in FIG. 2. A local alignment having a higher maximum local alignment score is shown as a larger rectangle in the local alignment display area 211.

A rectangle 1301 illustrated in FIG. 13 indicates the largest local alignment of the local alignments of the two documents. To the lower right of the largest local alignment, there is a space from which local alignments are not enumerated (1302). This is because the largest local alignment has a high maximum local alignment score, and hence the scores in a part subsequent thereto (to the lower right thereof) are not attenuated to 0, with the result that even when a new local alignment exists in the part, the new local alignment is not enumerated.

In other words, in the local alignment collection processing according to the first embodiment, too much emphasis is placed on the representativeness of the local alignments with the use of the pruning by start point match, which leads to a problem that the local alignments are not enumerated exhaustively.

Therefore, this embodiment solves the above-mentioned problem by placing a maximum gap length restriction.

As used herein, a gap length is a number of characters that are consecutively judged as the unmatch or the skip from the end point of the local alignment. Here, in the case of the character string C "aaaaa1234bbb" and the character string D "aaaaa5678bbb" illustrated in FIG. 12, the score of the fifth "a" is "10" and is the maximum local alignment score, and hence the fifth "a" is set to the end point of the local alignment. After the fifth "a", which is the end point, the character strings "1234" and "5678" do not match, which gives the gap length of 4.

The maximum gap length restriction restricts the gap length between local alignments to a predetermined value (maximum gap length) or smaller. In FIG. 12, if the predetermined value of the gap length is set to "3", at the point when it is determined that the character sequences "1234" and "5678" do not match, there is no chance that the local alignment "aaaaa" continues after the character "4" in the character string C and the character "8" in the character string D, and hence the local alignment is reset at the point. Therefore, the character string "bbb" in the part subsequent thereto can be enumerated as a new local alignment.

Figure 14:
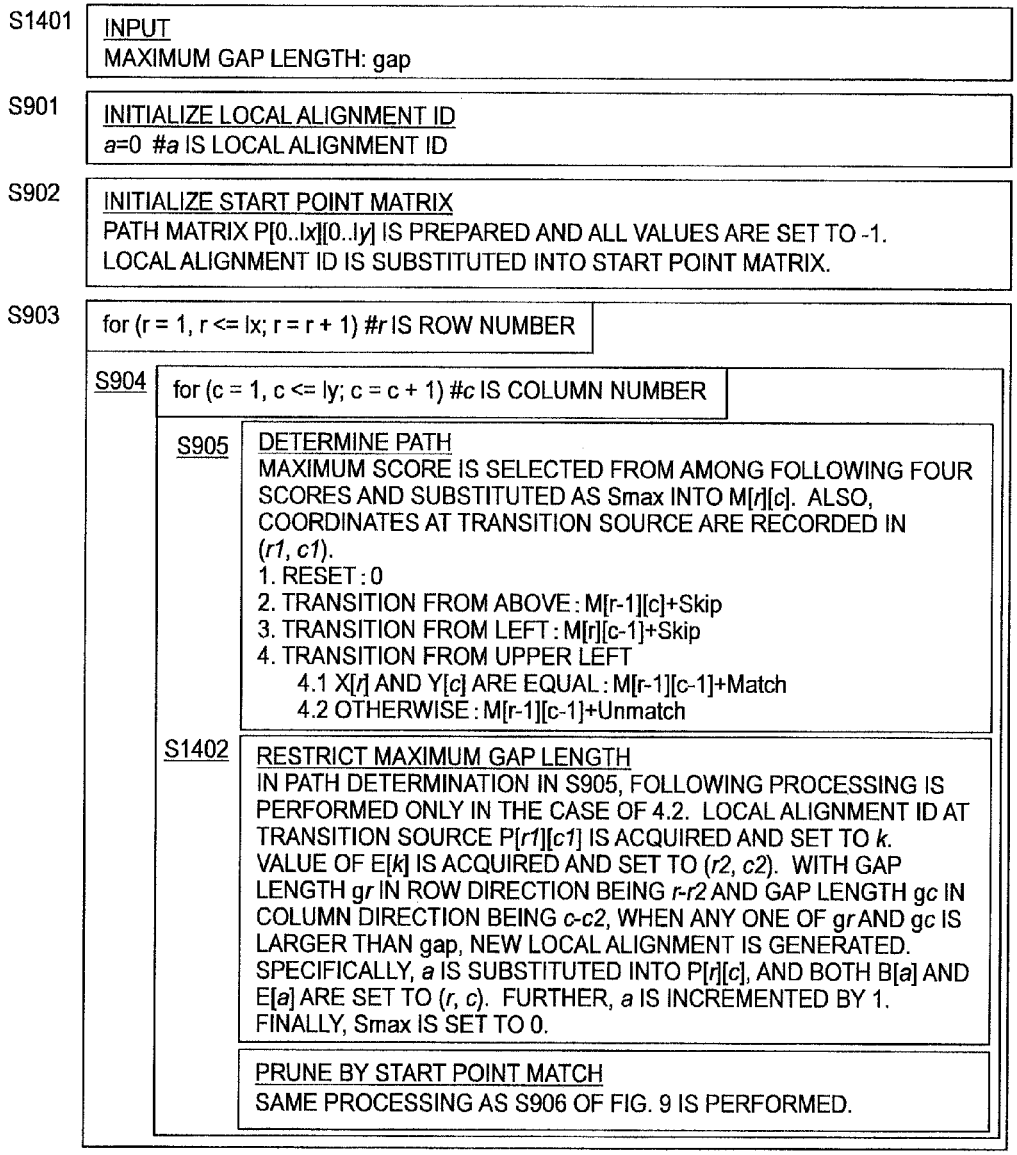
FIG. 14 is an explanatory diagram illustrating local alignment collection processing according to a second embodiment of this invention.

Referring to FIG. 14, details of the maximum gap length restriction are described.

FIG. 14 is an explanatory diagram illustrating local alignment collection processing according to the second embodiment of this invention.

The maximum gap length restriction can be realized just by adding the maximum gap length restriction processing to the local alignment collection processing according to the first embodiment illustrated in FIG. 9. Of the processing steps illustrated in FIG. 14, the same processing steps as those illustrated in FIG. 9 are denoted by the same reference symbols, and a description thereof is omitted.

First, the local alignment enumeration module 105 acquires the value input to the gap input box 205 illustrated in FIG. 2 as the maximum gap length (gap) (1401).

Then, the local alignment enumeration module 105 executes processing of S901 to S905, to thereby execute the maximum gap length restriction processing (1402).

In the processing of S905, only when the score in the case where the two characters corresponding to the cell to be processed do not match (4.2 in S905 illustrated in FIG. 14) is selected as the maximum score of the cell to be processed, the local alignment enumeration module 105 executes the maximum gap length restriction processing.

First, the local alignment enumeration module 105 acquires the local alignment ID registered in the cell at the transition source of the start point matrix illustrated in FIG. 10. Specifically, the local alignment enumeration module 105 acquires the local alignment ID (P[r1][c1]) of the cell corresponding to the coordinates (r1, c1), which is the cell at the transition source, of the cells of the start point matrix. It should be noted that the local alignment enumeration module 105 stores the acquired local alignment ID as k.

Next, the local alignment enumeration module 105 acquires the coordinates (r2, c2) of the end point of the local alignment identified by the acquired local alignment ID. Specifically, the local alignment enumeration module 105 acquires the coordinates (r2, c2) of the end point registered in the end point array E[k], which corresponds to the acquired local alignment ID(k), of the end point arrays E.

Next, the local alignment enumeration module 105 calculates the gap length from the coordinates (r2, c2) of the end point to the coordinates (r, c) of the cell to be processed. Specifically, the local alignment enumeration module 105 calculates the gap length in the row direction in accordance with r−r2, and calculates the gap length in the column direction in accordance with c−c2.

Then, when at least one of the calculated gap length in the row direction and the calculated gap length in the column direction is larger than the maximum gap length (gap), the local alignment enumeration module 105 sets a new local alignment and proceeds to S906.

Specifically, the local alignment enumeration module 105 registers a new local alignment ID(a) in the local alignment ID (P[r][c]) of the cell corresponding to the coordinates (r, c), which is the cell to be processed, of the cells of the start point matrix. Further, the local alignment enumeration module 105 registers the coordinates (r, c) of the cell to be processed in the start point array B[a] and the end point array E[a]. Then, the local alignment enumeration module 105 increments the new local alignment ID(a).

When, on the other hand, the calculated gap length in the row direction and the calculated gap length in the column direction are equal to or smaller than the maximum gap length (gap), the local alignment enumeration module 105 performs no processing and proceeds to S906.

It should be noted that, in S1402 of the local alignment processing illustrated in FIG. 14, the maximum gap length restriction processing is executed only when the score in the case where the two characters corresponding to the cell to be processed do not match is selected as the maximum score of the cell to be processed, but the maximum gap length restriction processing may be executed when the score of the skip is selected as the maximum score of the cell to be processed.

As described above, in this embodiment, in a case where a predetermined number of characters which are judged as the unmatch or the skip consecutively appear from the end point of the local alignment, a new local alignment is set. Therefore, even when a local alignment having a high score is enumerated, local alignments after the local alignment having the high score can be enumerated exhaustively.

Further, the maximum gap length restriction processing is executed while calculating the score of each cell of the score matrix, and hence can be executed with substantially the same amount of calculation as the conventional Smith-Waterman method.

Figure 15:
FIG. 15 is a display example of the local alignments enumerated by executing a local alignment processing according to the second embodiment of this invention.

FIG. 15 is a display example of the local alignments enumerated by executing the local alignment processing according to the second embodiment of this invention.

FIG. 15 is a display example of the local alignments in a case where the local alignment collection processing illustrated in FIG. 14 is executed on the same documents as those of FIG. 13.

In FIG. 15, local alignments in the part to the lower right of the largest local alignment (1301) of the local alignments of the two documents are also enumerated.

As described above, in this embodiment, the enumeration of the representative local alignments can be improved in exhaustiveness.

While the present invention has been described in detail and pictorially in the accompanying drawings, the present invention is not limited to such detail but covers various obvious modifications and equivalent arrangements, which fall within the purview of the appended claims.

What is claimed is:

1. A system for enumerating local alignments, comprising a local alignment enumeration module for enumerating local alignments, which are pairs of character strings that are similar between arbitrary two documents, the local alignment enumeration module comprising:
a first matrix generation module for generating a first matrix having a character string constituting one of the two documents as a row and a character string constituting another one of the two documents as a column, by registering, in a cell corresponding to a character constituting the character string in the row and a character constituting the character string in the column, a score indicating similarity at the two characters corresponding to the cell; and
a second matrix generation module for generating a second matrix by registering, in a cell corresponding to the cell for which the score is calculated by the first matrix generation module, of cells of the second matrix corresponding to cells of the first matrix, an identifier of a local alignment to which the two characters corresponding to the cell belong, the score registered in the cell of the first matrix having a value that becomes larger as the similarity between the two character strings corresponding to the cell becomes higher, the first matrix generation module being configured to:
calculate scores of the cell for which the score is to be calculated based on values that are preset to paths from cells for which scores are already calculated, of cells adjacent to the cell to be calculated, to the cell to be calculated;
register a maximum score of the calculated scores as the score of the cell to be calculated; and
store a cell which is an origin of a path via which the maximum score is calculated as a cell at a transition source, the second matrix generation module being configured to:
in a case where a cell of the second matrix corresponding to the cell at the transition source indicates that the cell does not belong to any local alignment and in a case where the maximum score calculated by the first matrix generation module is a predetermined value, register an identifier of a new local alignment in the cell of the second matrix corresponding to the cell to be calculated, and store the cell to be calculated as a start point of the new local alignment; and
in a case where the cell of the second matrix corresponding to the cell at the transition source indicates that the cell belongs to a local alignment, and in a case where the maximum score calculated by the first matrix generation module is larger than the predetermined value, register, in the cell of the second matrix corresponding to the cell to be calculated, an identifier of a local alignment registered in the cell of the second matrix corresponding to the cell at the transition source, and further, in a case where the maximum score calculated by the first matrix generation module is larger than the maximum score of the cells belonging to the same local alignment, store the cell to be calculated as an end point of the local alignment.

2. The system for enumerating local alignments according to claim 1, wherein the first matrix generation module is further configured to:
select a row at a top of the first matrix and calculate the scores of cells in the row sequentially from a leftmost cell rightward;
in a case where the scores are calculated for all the cells in the selected row, select a row below the selected row;
in a case where the score of the cell to be calculated is calculated based on a path from an adjacent cell above the cell to be calculated to the cell to be calculated, calculate the score to be calculated by subtracting a first predetermined value from a score of the upper adjacent cell, which is already calculated;
in a case where the score of the cell to be calculated is calculated based on a path from an adjacent cell to the left of the cell to be calculated to the cell to be calculated, calculate the score to be calculated by subtracting a second predetermined value from a score of the left adjacent cell, which is already calculated;
in a case where the score of the cell to be calculated is calculated based on a path from an adjacent cell to the upper left of the cell to be calculated to the cell to be calculated, judge whether or not the two characters corresponding to the cell to be calculated match;
in a case where it is judged that the two characters corresponding to the cell to be calculated match, calculate the score to be calculated by adding a third predetermined value to a score of the upper-left adjacent cell, which is already calculated; and
in a case where it is judged that the two characters corresponding to the cell to be calculated do not match, calculate the score to be calculated by subtracting a fourth predetermined value from the score of the upper-left adjacent cell, which is already calculated.

3. The system for enumerating local alignments according to claim 1, wherein the second matrix generation module is further configured to:
judge whether or not a predetermined number of cells for which the two characters do not match consecutively appear from the cell as the end point of the local alignment to which the predetermined number of cells belong; and
in a case where it is judged that the predetermined number of cells for which the two characters do not match consecutively appear from the cell as the end point, register the identifier of the new local alignment in the cell of the second matrix corresponding to the cell to be calculated even if the maximum score calculated by the first matrix generation module is larger than the predetermined value, and store that the two characters corresponding to the cell to be calculated are the start point of the new local alignment.

4. The system for enumerating local alignments according to claim 3, wherein the local alignment enumeration module sets the predetermined number for registering the identifier of the new local alignment in the cell of the second matrix corresponding to the cell to be calculated even if the maximum score calculated by the first matrix generation module is larger than the predetermined value, to a value input by a user.

5. The system for enumerating local alignments according to claim 1, further comprising a local alignment display control module for controlling display of the local alignments enumerated by the local alignment enumeration module,
wherein the local alignment display control module is configured to:
on a two-dimensional map having a character string constituting the one of the two documents as a row and a character string constituting the another one of the two documents as a column, show start points and end points of the local alignments enumerated by the local alignment enumeration module by rectangles; and display a list of distributions of the local alignments in a row direction and a column direction.

6. The system for enumerating local alignments according to claim 5, wherein the local alignment display control module is further configured to:

calculate the distribution of the local alignments in the row direction by adding maximum scores of the local alignments existing in the row direction; and calculate the distribution of the local alignments in the column direction by adding the maximum scores of the local alignments existing in the column direction.

7. The system for enumerating local alignments according to claim 5, wherein the local alignment display control module is further configured to:

calculate the distribution of the local alignments in the row direction by adding numbers of the local alignments existing in the row direction; and calculate the distribution of the local alignments in the column direction by adding numbers of the local alignments existing in the column direction.

8. A computer-implemented method for enumerating local alignments, the computer-implemented method effecting, via a computer, operations including:

enumerating local alignments, which are pairs of character strings that are similar between arbitrary two documents;

generating a first matrix having a character string constituting one of the two documents as a row and a character string constituting another one of the two documents as a column, by registering, in a cell corresponding to a character constituting the character string in the row and a character constituting the character string in the column, a score indicating similarity at the two characters corresponding to the cell; and generating a second matrix by registering, in a cell corresponding to the cell for which the score is calculated in the generating of the first matrix, of cells of the second matrix corresponding to cells of the first matrix, an identifier of a local alignment to which the two characters corresponding to the cell belong, the score registered in the cell of the first matrix having a value that becomes larger as the similarity between the two character strings corresponding to the cell becomes higher, the generating of the first matrix including operations of:

calculating scores of the cell for which the score is to be calculated based on values that are preset to paths from cells for which scores are already calculated, of cells adjacent to the cell to be calculated, to the cell to be calculated;

registering a maximum score of the calculated scores as the score of the cell to be calculated; and storing a cell which is an origin of a path via which the maximum score is calculated as a cell at a transition source, the generating of the second matrix including:

in a case where a cell of the second matrix corresponding to the cell at the transition source indicates that the cell does not belong to any local alignment and in a case where the maximum score calculated in the generating of the first matrix is a predetermined value, registering an identifier of a new local alignment in the cell of the second matrix corresponding to the cell to be calculated, and storing that the two characters corresponding to the cell to be calculated are a start point of the new local alignment; and in a case where the cell of the second matrix corresponding to the cell at the transition source indicates that the cell belongs to a local alignment, and in a case where the maximum score calculated in the generating of the first matrix is larger than the predetermined value, registering, in the cell of the second matrix corresponding to the cell to be calculated, an identifier of a local alignment registered in the cell of the second matrix corresponding to the cell at the transition source, and further, in a case where the maximum score calculated in the generating of the first matrix is larger than the maximum score of the cells belonging to the same local alignment, storing that the two characters corresponding to the cell to be calculated are an end point of the local alignment.

9. The computer-implemented method for enumerating local alignments according to claim 8, wherein the generating of the first matrix further includes operations of:

selecting a row at a top of the first matrix and calculating the scores of cells in the row sequentially from a leftmost cell rightward;

in a case where the scores are calculated for all the cells in the selected row, selecting a row below the selected row;

in calculating the score of the cell to be calculated based on a path from an adjacent cell above the cell to be calculated to the cell to be calculated, calculating the score to be calculated by subtracting a first predetermined value from a score of the upper adjacent cell, which is already calculated;

in calculating the score of the cell to be calculated based on a path from an adjacent cell to the left of the cell to be calculated to the cell to be calculated, calculating the score to be calculated by subtracting a second predetermined value from a score of the left adjacent cell, which is already calculated;

in calculating the score of the cell to be calculated based on a path from an adjacent cell to the upper left of the cell to be calculated to the cell to be calculated, judging whether or not the two characters corresponding to the cell to be calculated match;

in a case where it is judged that the two characters corresponding to the cell to be calculated match, calculating the score to be calculated by adding a third predetermined value to a score of the upper-left adjacent cell, which is already calculated; and in a case where it is judged that the two characters corresponding to the cell to be calculated do not match, calculating the score to be calculated by subtracting a fourth predetermined value from the score of the upper-left adjacent cell, which is already calculated.

10. The computer-implemented method for enumerating local alignments according to claim 8, wherein the generating of the second matrix further including operations of:

judging whether or not a predetermined number of cells for which the two characters do not match consecutively appear from the cell as the end point of the local alignment to which the predetermined number of cells belong; and in a case where it is judged that the predetermined number of cells for which the two characters do not match consecutively appear from the cell as the end point, registering the identifier of the new local alignment in the cell of the second matrix corresponding to the cell to be calculated even if the maximum score calculated in the generating of the first matrix is larger than the predetermined value, and storing that the two characters corresponding to the cell to be calculated are the start point of the new local alignment.

11. The computer-implemented method for enumerating local alignments according to claim 10, further including setting the predetermined number for registering the identifier of the new local alignment in the cell of the second matrix corresponding to the cell to be calculated even if the maximum score calculated in the generating of the first matrix is larger than the predetermined value, to a value input by a user.

12. The computer-implemented method for enumerating local alignments according to claim 8, further including controlling display of the local alignments enumerated in the enumerating of the local alignments,
wherein the controlling of the display of the local alignments includes operations of:
on a two-dimensional map having a character string constituting the one of the two documents as a row and a character string constituting the another one of the two documents as a column, showing start points and end points of the local alignments enumerated in the enumerating of the local alignments by rectangles; and
displaying a list of distributions of the local alignments in a row direction and a column direction.

13. The computer-implemented method for enumerating local alignments according to claim 12, wherein the controlling of the display of the local alignments further includes operations of:
calculating the distribution of the local alignments in the row direction by adding maximum scores of the local alignments existing in the row direction; and
calculating the distribution of the local alignments in the column direction by adding the maximum scores of the local alignments existing in the column direction.

14. The computer-implemented method for enumerating local alignments according to claim 12, wherein the controlling of the display of the local alignments further includes operations of:
calculating the distribution of the local alignments in the row direction by adding numbers of the local alignments existing in the row direction; and
calculating the distribution of the local alignments in the column direction by adding numbers of the local alignments existing in the column direction.

* * * * *